(12) United States Patent
Schrott et al.

(10) Patent No.: US 6,335,685 B1
(45) Date of Patent: Jan. 1, 2002

(54) APPARATUS AND METHOD FOR LOCATING CONTAINERS AND CONTENTS OF CONTAINERS USING RADIO FREQUENCY TAGS

(75) Inventors: Alejandro Gabriel Schrott; Robert Jacob von Gutfeld, both of New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/521,712

(22) Filed: Mar. 9, 2000

(51) Int. Cl.[7] .............................................. G08B 13/14
(52) U.S. Cl. .......................... 340/572.1; 340/825.36; 340/5.92; 340/10.1; 340/10.3; 340/825.49; 235/385
(58) Field of Search .......................... 340/572.1, 572.4, 340/572.7, 572.8, 825.36, 10.1, 10.3, 10.32, 10.33, 10.42, 10.51, 825.49, 5.92; 235/375, 385

(56) References Cited

U.S. PATENT DOCUMENTS

| | | | | |
|---|---|---|---|---|
| 5,317,309 A | * | 5/1994 | Vercellotti et al. | 340/10.42 |
| 5,539,394 A | * | 7/1996 | Cato et al. | 340/10.1 |
| 5,550,547 A | * | 8/1996 | Chan et al. | 342/42 |
| 5,565,858 A | * | 10/1996 | Guthrie | 340/5.92 |
| 5,606,323 A | * | 2/1997 | Heinrich et al. | 340/10.34 |
| 5,869,820 A | * | 2/1999 | Chen et al. | 235/376 |
| 5,912,632 A | * | 6/1999 | Dieska et al. | 340/10.1 |
| 5,920,261 A | * | 7/1999 | Hughes et al. | 340/572.1 |
| 5,942,987 A | * | 8/1999 | Heinrich et al. | 340/10.1 |
| 6,056,199 A | * | 5/2000 | Wiklof et al. | 235/462.45 |
| 6,166,638 A | * | 12/2000 | Brady et al. | 340/572.7 |

* cited by examiner

*Primary Examiner*—Benjamin C. Lee
*Assistant Examiner*—Toan Pham
(74) *Attorney, Agent, or Firm*—Ohlandt, Greenley, Ruggiero & Perle, LLP; Louis J. Percello, Esq.

(57) ABSTRACT

A computerized base station system communicates with radio frequency tags attached to one or more objects. Included in the system is a separate position detector that determines the position of one or more of the tags within a time increment and within a field of the base station. A communication process reads information from one or more of the tags within the time increment and associates the position determined with the information of the respective tag.

20 Claims, 14 Drawing Sheets

US 6,335,685 B1

APPARATUS AND METHOD FOR LOCATING CONTAINERS AND CONTENTS OF CONTAINERS USING RADIO FREQUENCY TAGS

RELATED PATENTS AND APPLICATIONS

Related U.S. Pat. Nos. include: 5,866,044; 5,521,601; 5,528,222; 5,538,803; 5,550.547; 5,552,778; 5,554,974; 5,563,583; 5,565,847; 5,606,323; 5,635,693; 5,673,037; 5,680,106;5,682,143; 5,729,201; 5,729,697;5,736,929; 5,739,754; 5,767,789; 5,777,561; 5,786,626; 5,812,065; 5,821,859; 5,828,318; 5,831,532; 5,850,181; 5,874,902; 5,889,489; 5,909,176; and 5,912,632. These U.S. patents are herein incorporated by reference in their entirety.

FIELD OF INVENTION

This invention relates to RFID or radio frequency identification applications. More specifically, the invention relates to identifying particular items when there are a multitude tags on containers of objects in the field of the RFID tag reader.

BACKGROUND OF THE INVENTION

RFID has become a pervasive technology for tracking and identifying people, vehicles, retail items, pallets etc. One of the frequent applications of RFID is that of tracking pallets as they move past a tag reader or 'base station'. Generally pallets as used in industry contain a large number of individual boxes or crates. Each crate may contain an individual, unique RFID tag. The tag may contain generic or even detailed data relating to the contents of the crate. However, present day tag readers cannot distinguish between or amongst the multitude of tags that are presented in the field. Thus, while all the tags are read in a sequential manner, the reader output cannot distinguish which tag corresponds to the particular package or crate. This lack of correlation between the tag reader and the crate makes it impossible to know which crate to unload at a particular location unless all the crates and their contents are identical. In those cases where the crates are not all identical in content, it becomes necessary to scan each tag individually in order to know which crate to unload, a time consuming and impractical solution to today's methods of distribution.

However, the prior art does not disclose ways that accurately and simply correlate information obtained by reading one or more tags to the specific location of the respective tag. In particular, the correlation of information and position of tag objects is not disclosed in the art related to inventory control or processing containers and/or contents in those containers.

OBJECTS OF THE INVENTION

It is the object of this invention to modify the conventional method of scanning RFID tags to correlate tag information with tag/object position of each tagged object and/or separately packaged item (in a container). It is another object of this invention to modify the conventional method of scanning RFID tags to correlate tag information with tag/object position of each tagged object and/or separately packaged item (in a container) on pallets.

SUMMARY OF THE INVENTION

The present invention comprises a base station system for communicating with radio frequency tags attached to one or more objects. The base station has one or more computers, each having one or more central processing units (CPUs) and one or more memories. A separate position detector determines the position of one or more of the tags within a time increment and within a field of the base station. A communication process, executed by one or more of the CPUs, reads information from one or more of the tags within the time increment and associates the position determined with the information of the respective tag in one or more of the memories.

In one embodiment of the invention a movable or non-stationary base station antenna providing a narrow tag interrogation beam is used as the position detector. The reflected wave from the tag may also be narrow though this is not required. The antenna of the reader is designed to have rotational motion to allow for scanning in a vertical plane. Scanning can then be accomplished as a function of position with the antenna scanning vertically while the object (e.g. pallet) moves horizontally. In this mode of scanning, each tag is scanned individually as it passes the base station antenna so that the combination of horizontal pallet motion with vertical scanning results in an xy coordinate associated with each tag readout. The horizontal motion ( x direction) can be determined by knowing the velocity of the object (pallet). This can be accomplished by way of a photocell as the pallet enters a given position and exits a second position together with the knowledge of the time interval between the two photo signals. Stationary pallets can also be scanned by an antenna which can have motion in both x and y directions. Scanning can also be accomplished with fixed or stationary antenna by using a laser beam that scans and turns on individual tags for a brief time. In that case, a wide field antenna is preferably used.

DETAILED DESCRIPTION OF THE INVENTION

In general, areas (e.g. pallets) having RFID tagged containers (e.g. crates) can be interrogated as they pass a base station which is designed to send out an RF wave and receive the reflected wave from the tags. However, the difficult problem is identifying which crate has been read and what position that crate has on the pallet because the detection volume is generally quite large. Therefore, the reader will read all the tags in a matter of milliseconds but additional action is needed to identify which tag reading corresponds to a particular crate on the cart or pallet. Traditionally, knowledge of a particular crate requires a bar code attached to the crate or any one of several methods to make an additional close range measurement or visual inspection to correlate the RFID reading with the particular box or package on the pallet.

The present invention describes several techniques to facilitate the operation that is presently tedious while also providing a method that is suitable for a fully automated distribution system. The invention determines a one to one correspondence between the tag identification presented to the base station and the position of the scanned item. When the containers are moved from a storage area (e.g. a pallet is unloaded), it will be clear which box (container) relates to the particular tag and the description that the tag offers of the item or items within the tagged container.

Figure 1:
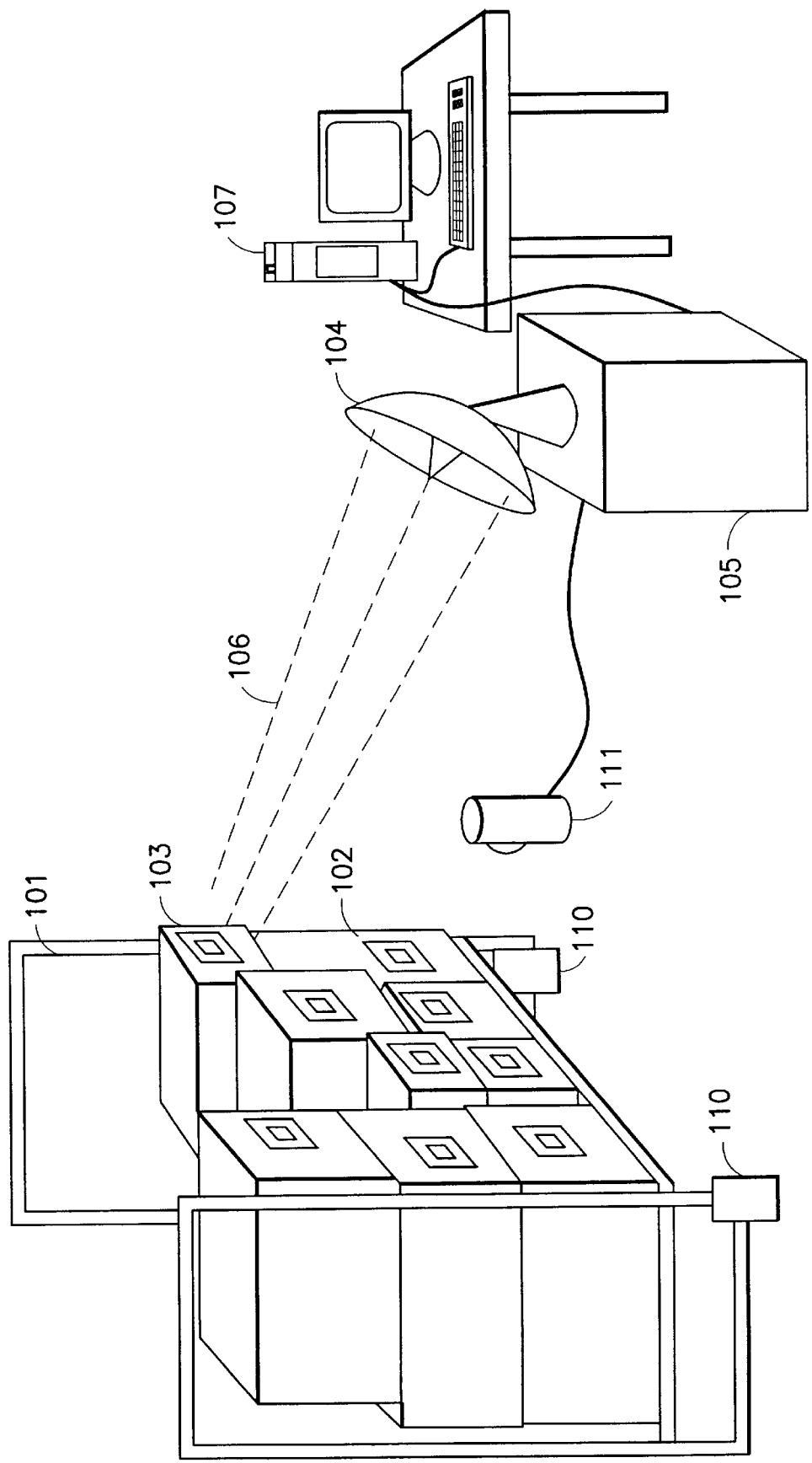
FIG. 1 is a block diagram cart containing boxes (containers) that have tags passing near a focused beam antenna for reading the tags.

In FIG. 1 the stationary pallet 101 contains crates 102, each of which has an RF tag 103 attached to the end of the box facing an antenna 104, the antenna attached to a base station 105. The antenna 104 is designed to be directional and have a far field beam diameter of 30 cm at ~1 meter from tag. At a greater distance between antenna and tag, the beam diameter can be made even smaller. When the cart is in a position such that one box end faces the antenna, that is the beam of the antenna 106 is approximately perpendicular to the face of the box, the antenna is able to scan the boxes. The scanning is achieved by having the antenna mounted on two axes that permit vertical and horizontal motion. This type of motion is well known in the field of radar. The amplitude of the motion is controlled so that the entire cart is scanned while the cart or pallet is stationary but in a prescribed location in order that the scanning beam can access all the tags on the pallet. The scanning and retrieval of the information from the tags is controlled by a computer 107.

In a second embodiment, also shown FIG. 1, the tags on the boxes need not be addressed in a predetermined cart position. Here the cart can be in motion, either step wise or continuous with a starting and ending temporal flag 110 that can be sensed for example by an electric or acoustic sensor or sensors, a photocell 111, a pressure sensor in the floor etc. well known by those skilled in the art for determining time intervals. In this embodiment the need for the horizontal scan is avoided since the timing between the two flag intervals determines the velocity of the pallet and hence offers a simple means for determining the position of the cart or pallet as a function of time.

Figure 2A:
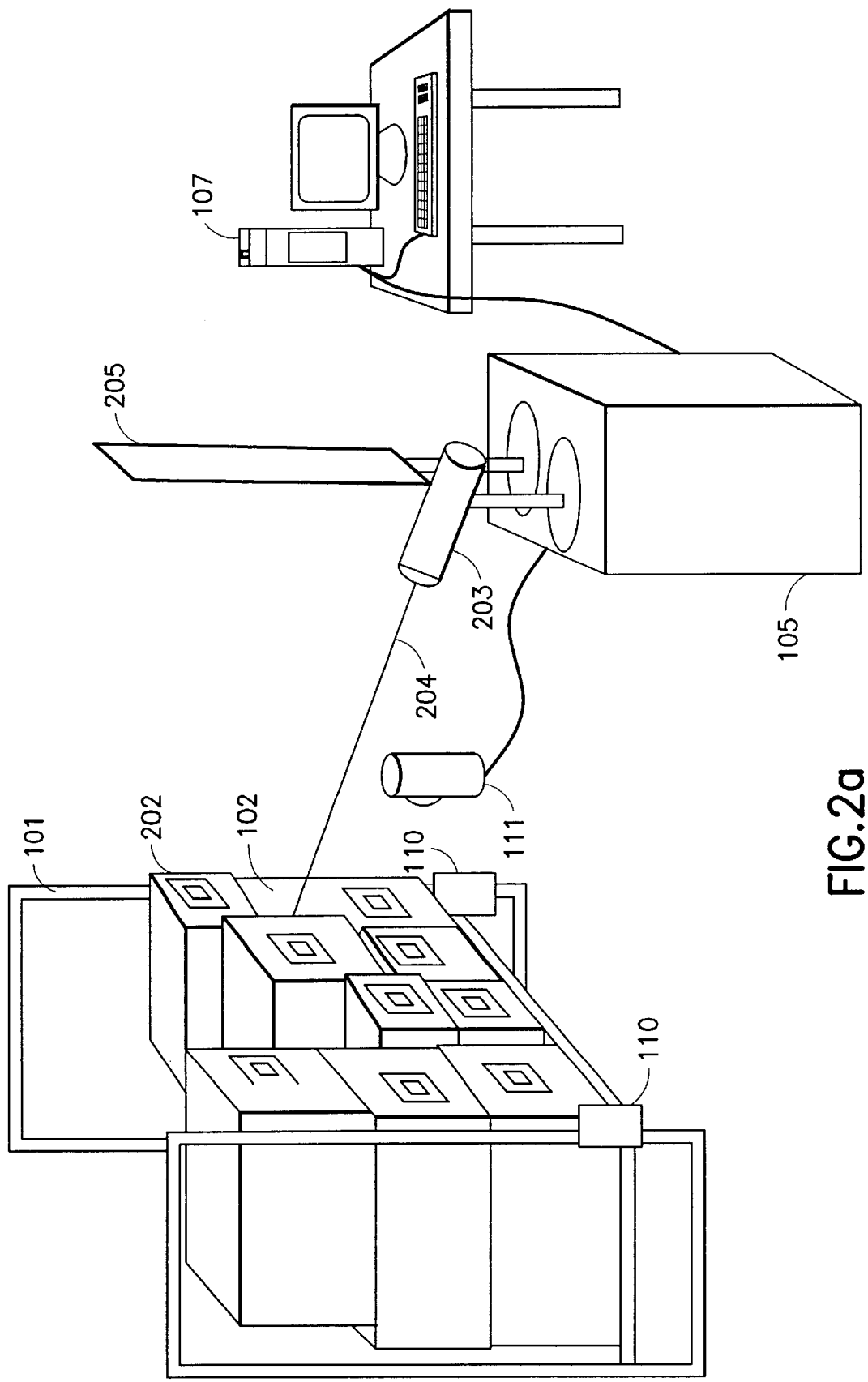
FIG. 2a is a block diagram showing a cart containing crates or boxes as in FIG. 1, except here passing a laser beam which activates the tags attached to the crates.

In yet another embodiment FIG. 2a, the tag reading is achieved by a wide RF beam rather than a focused antenna. In this case the tags 202 contain a light sensitive switch mechanism or photocell so that when illuminated they are switched on. A laser 203 is used to scan the tags which switches the heretofore quiescent tag to an active state or 'on' state when the laser beam 204 is incident on a particular tag. After the laser is no longer incident on the tag, the tag can stay active for a set duration and return to its quiescent state thereby preventing it from being read more than once by the wide beam antenna. With only one tag turned on at a time, the wide beam antenna 205 will only read one tag at a time whose position is then known in both space and time by computing the angular detection of the laser. This mode of operation makes it possible to leave the antenna fixed in space while the laser scans in the plane of the tags, turning them on sequentially. The tags can be configured so that they turn off after a set period after the laser no longer is incident on them or can be turned off by a command from the computer. The laser scans in two dimensions by computer control. As in the previous case, a set of flags 110 can be used to determine the position of the cart, for both the case of a stationary or moving cart.

Figures 2B, 2C:
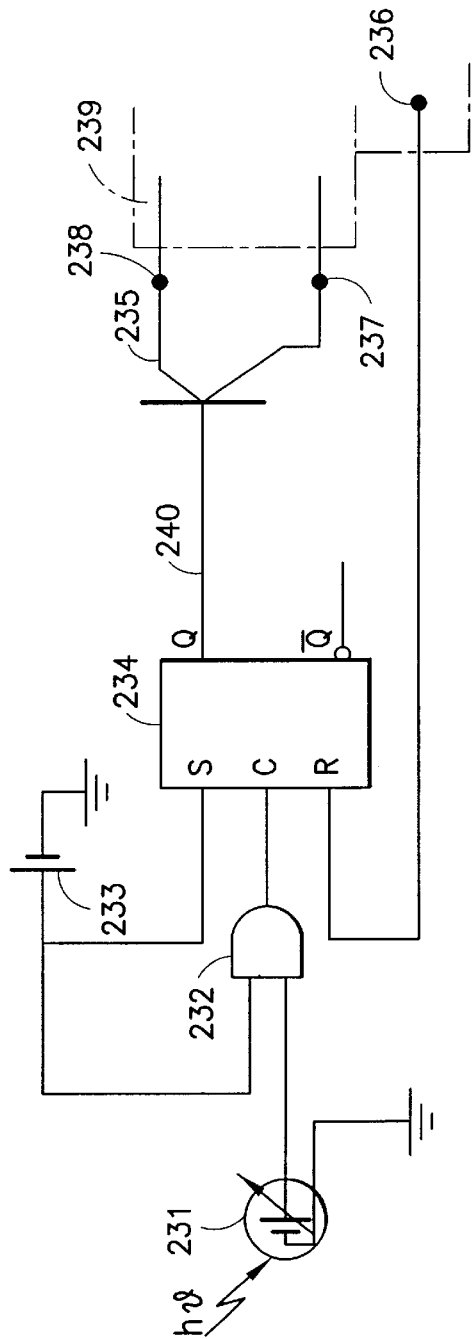
FIG. 2b is a diagram showing the logic circuit related with the light activated tag.
FIG. 2c is a table (from prior art) showing the reduced characteristics for the S-R latches.

As shown in FIG. 2b, the tag of FIG. 2a uses a photovoltaic cell 231 in one of the preferred embodiments. The cell 231 is connected to an AND gate 232 while a second terminal of 232 is connected to a battery or voltage source 233 that supplies a constant voltage equivalent to a logical '1'. The output of 232 is connected to the 'C' input of a S-R-NOR latch described in detail in Modern Digital Designs by R. S. Sandige, McGraw Hill (1990) which is incorporated by reference in its entirety. The 'S' input is also connected to 233 and the 'R' input is connected to the disconnect circuit 236. This circuit when activated put a temporary '1' on input 'R'.

When the laser light powers the photocell 231, a '1' is set on input 'C' of 234. That in turn sets 'Q' equal to '1' in 234. This '1' is applied to the base 240 of a transistor 235 or to any device with a similar function. This last step produces a conducting path between collector and emitter in transistor 235 connecting 238 with 237 which closes a circuit in a critical part 239 of the tag to disable the tag. Note that in alternative preferred embodiments, the photovoltaic cell has a filtering device, e.g. any well known optical filter, that discriminates ambient light from the laser light signal.

For the description of the critical part 239 that enables/disables the tag, refer to Docket Y0996-037, entitled Radio Frequency Identification Transponder with Electronic Circuit Enabling/Disabling Capability, to Capek et al., U.S. patent application Ser. No. 08/681,741. After the tag has been interrogated one option is that the tag shuts itself off after a short period time in a manner well known to those skilled in the art. Alternatively, the tag can set a a temporary '1' in 236 which sets 'R' equal to '1' and therefore the latch 234 resets 'Q' equal to zero, thereby opening the path between 238 and 237, thereby disabling the tag. It is well known to those skilled in the art that similar enabling/disabling functions can be facilitated using a photodiode in series with the battery 233 while the AND gate 232 can be replaced by an OR gate with one terminal connected to ground. Other combinations of logical devices to carry out this function are well known to those skilled in the art. The characteristic table for the S-R latches is shown in FIG. 2c, generally known in the prior art. See for example Modern Digital Designs by R. S. Sandige, McGraw Hill (1990).

Figure 2D:
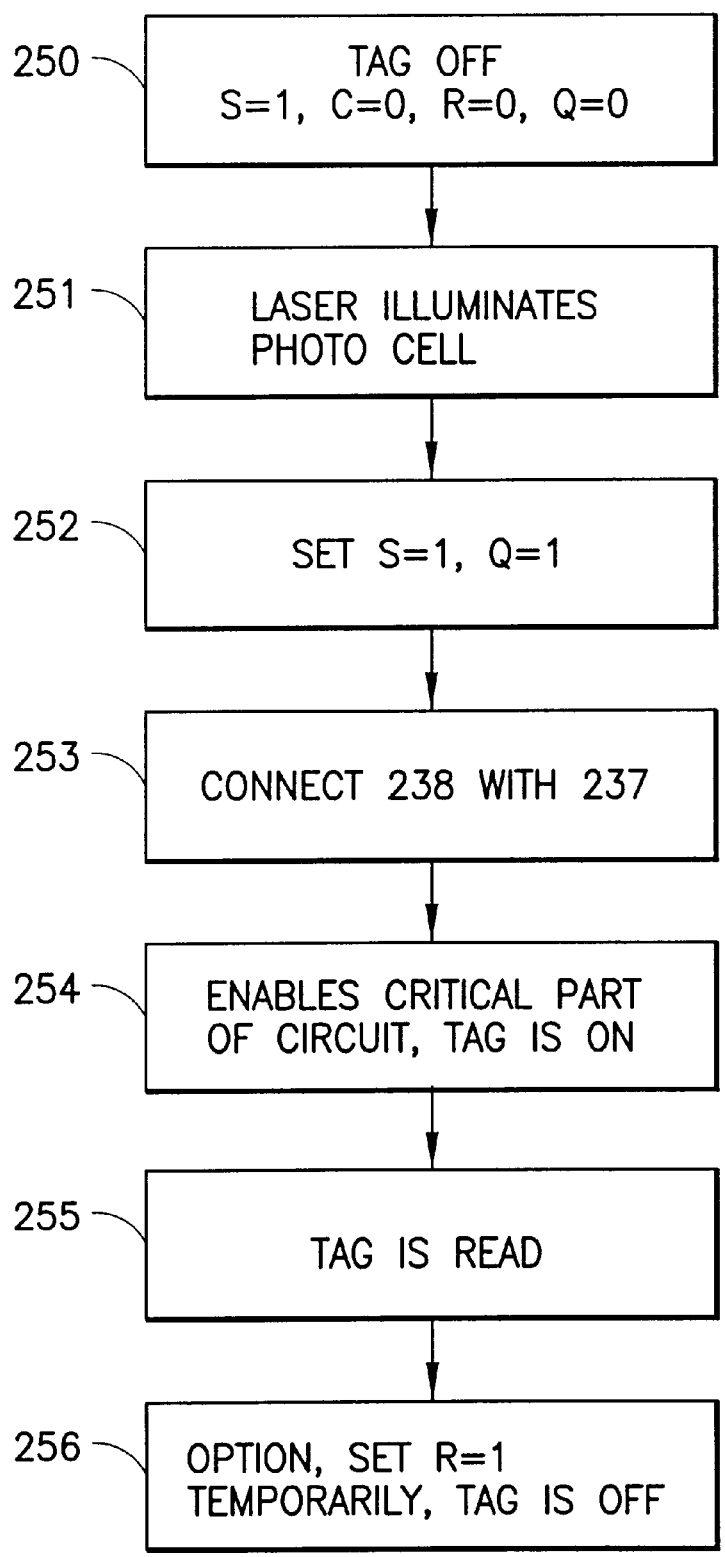
FIG. 2d is a flow diagram of the tag activation by a light source.

FIG. 2d describes the flow diagram for the process that starts 250 with the tag in an off position where 'S=1 and C,R,Q' are set to zero in latch 234. In 251 the laser or light source illuminates the photocell setting 252, S=1, Q=1 in 234 connecting 253, the parts 238 and 237 which close the circuit in 239 enabling 254, a critical part of the circuit making the tag active from its previous quiescent state. The tag remains active even though the light is no longer incident and the tag is read 255. After the tag is read, the tag can be shut via its own circuit as is well known in the art or alternatively, set 'R' =1 in 234 temporarily, which will open the transistor disabling the critical circuit 239 thus putting the tag back into its quiescent state.

FIG. 3 shows a flow diagram indicating the logic steps for FIG. 1 for the case that the pallet is stationary in a predetermined position. Step 301 the starting flag signals the start of the reading process. The variable, j, determining the horizontal movement of the antenna is set to zero, 302. The next step determining the vertical scan given by letter i, is set to 0, 303. In the next step, 304, the antenna is pointed in a direction given by coordinates, i, j in a direction given by the variable $H_{ij}$. In the following step 305 the signal $ID_{ij}$ designating the identification of the i,j tag is queried and read by the base station. If $ID_{ij}$ is non-zero, the system 306 reads $H_{ij}$, $ID_{ij}$ and $INFO_{ij}$, which describes the content of each crate which has a tag $ID_{ij}$. In the next step 307 the computer compares $ID_{ij}$ with $ID_{1-l,\,j}$. If these two readings are the same, then the average value between $H_{i-1,j}$ and $H_{ij}$, represented by $>H_{i-1,j}$, $H_{ij}$, step 308. Next, the comparator compares 309 $ID_{ij}$ with $ID_{1j-l}$. If they are the same, then the average value $<H_{ij-1}$, $H_{ij}>$ is assigned to $H_{ij}$, step 310. In the next step 311 the variable 'i' is incremented by one and its value is compared with the upper limit, n. If the value of 'i' is greater or equal to n, then in the next step 313, the horizontal value j is incremented by one. In the next step 314 the value of 'j' is compared with an upper limit 'm'. If 'j' is larger or equal than m then $H_{ij}$, $ID_{ij}$, and $INFO_{ij}$ are displayed in step 315. Commands are issued in step 316 to unload specified boxes by means of a robot or manually and the process stops 317. To address the case of level 305 where $ID_{ij}$ is equal to zero, the next logic step is step 311. If $ID_{ij}$ is not equal to $ID_{i-1,j}$, level 307 the next logic step is step 308. If $ID_{ij-1}$ is not equal to $ID_{ij}$, then the next logic step is 311. If i<n in level 312 then the next logic step is 304. Finally if j<m in level 314, the next logic step is 303.

In another embodiment the tag is turned off after it is read and stays off for a predetermined interval consistent with the other time-dependent parameters of the scanning system. For that case, the flow diagram is shown FIG. 3b. The step 321 signals the start of the reading process. The antenna continues scanning 322 until it detects the signal containing the ID of a tag at position 'i,j'. The time required for reading the tag is kept small compared to the scanning time, that is the time to traverse the diameter of the tag. The following steps comprise reading the position of the tag, $H_{ij}$, 324 reading the $ID_{ij}$ 325, reading $INFO_{ij}$ 326 and turning the tag off, 327. The next step requires checking to see that the end flag 328 has been reached. If so, the system displays all the $H_{ij}$'s, $ID_{ij}$'s and $INFO_{ij}$'s. The following step issues commands 330 and stops the process 331. If the end flag is not detected, the system continues to scan 322.

Figure 3A:
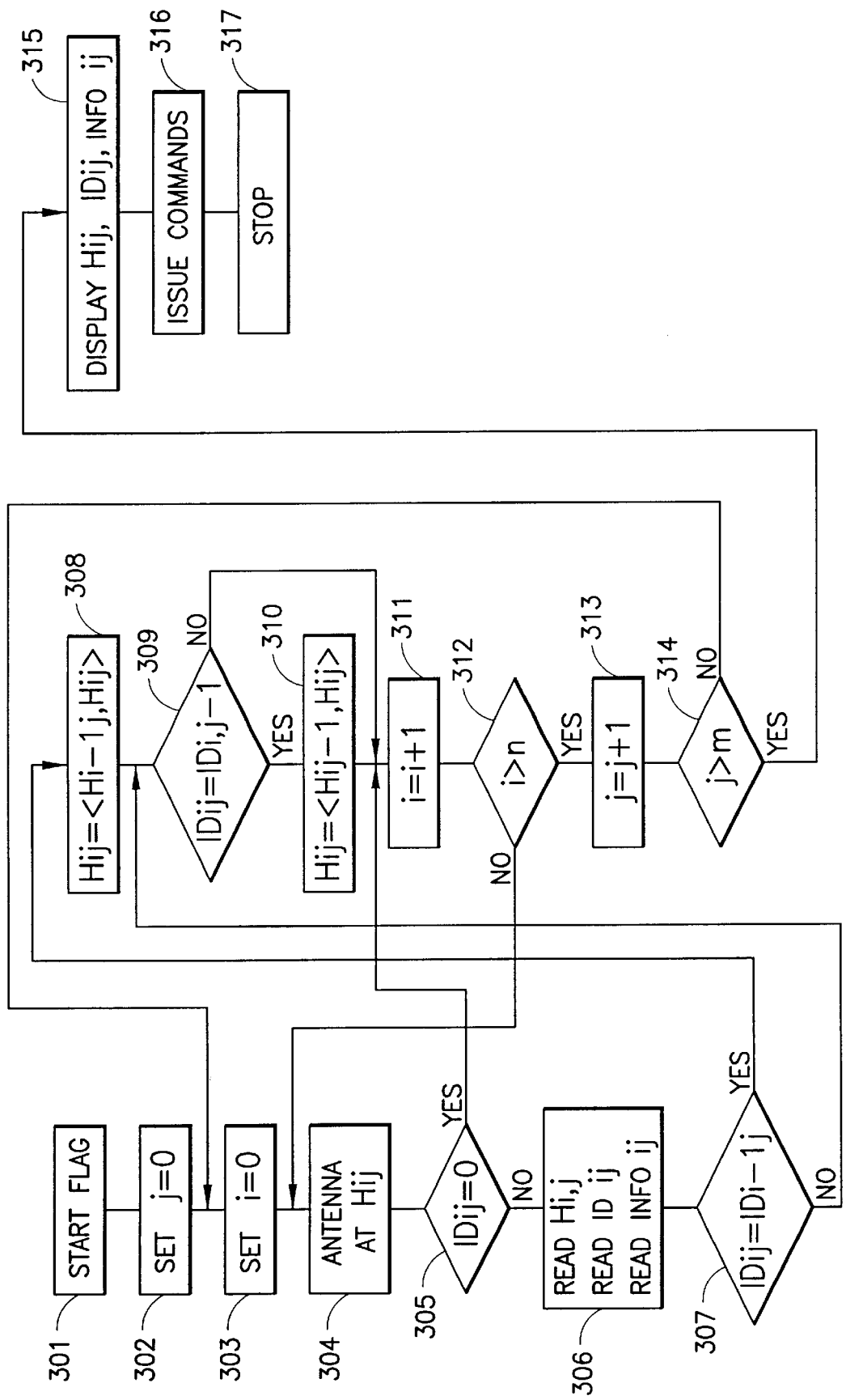
FIG. 3a is a flow diagram of tag reading by a narrow beam antenna for the case where the cart containing the tagged crates is at rest.
Figure 3B:
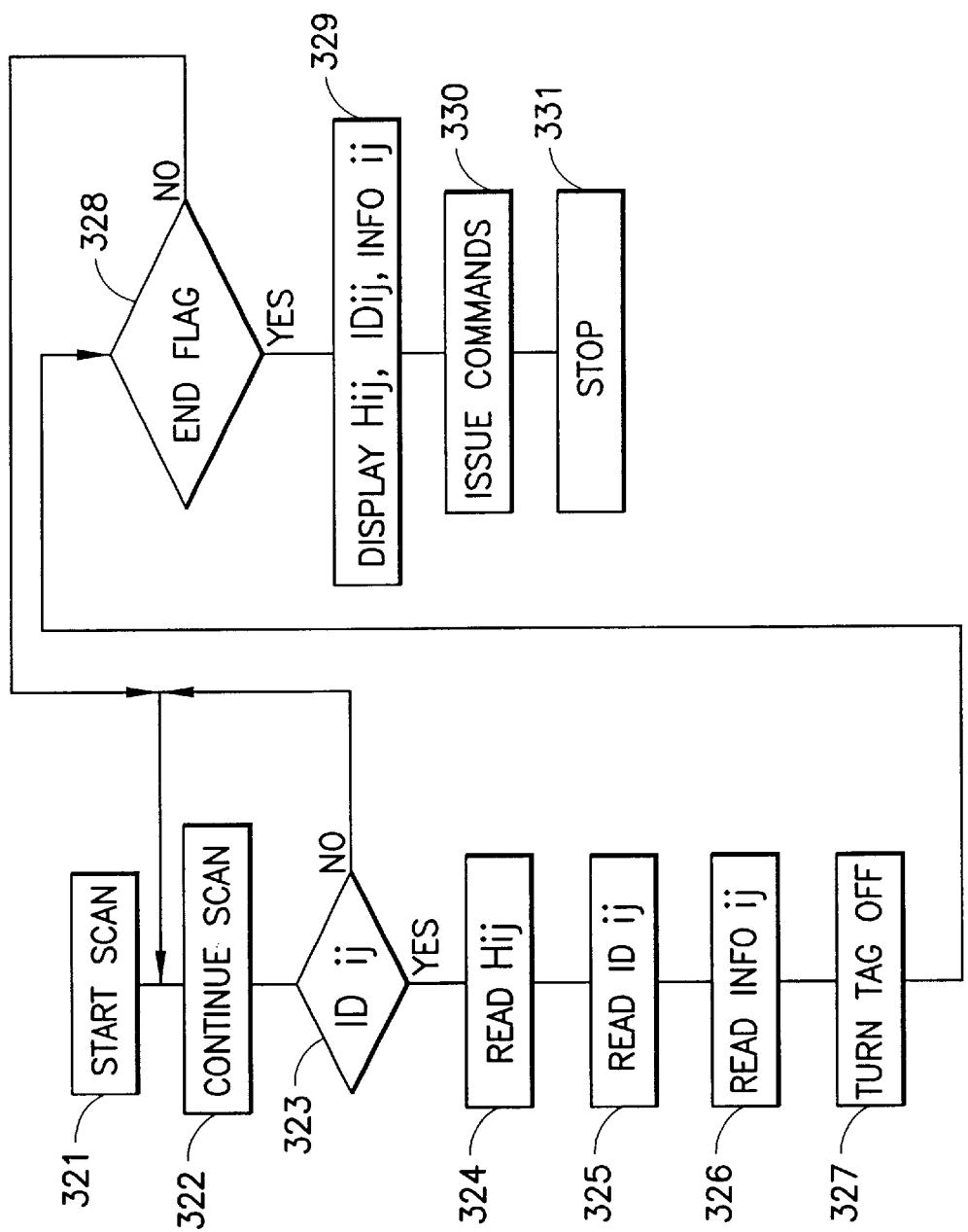
FIG. 3b is the same as FIG. 3a except that each tag is turned off after the first interrogation and reading of a tag.
Figure 4A:
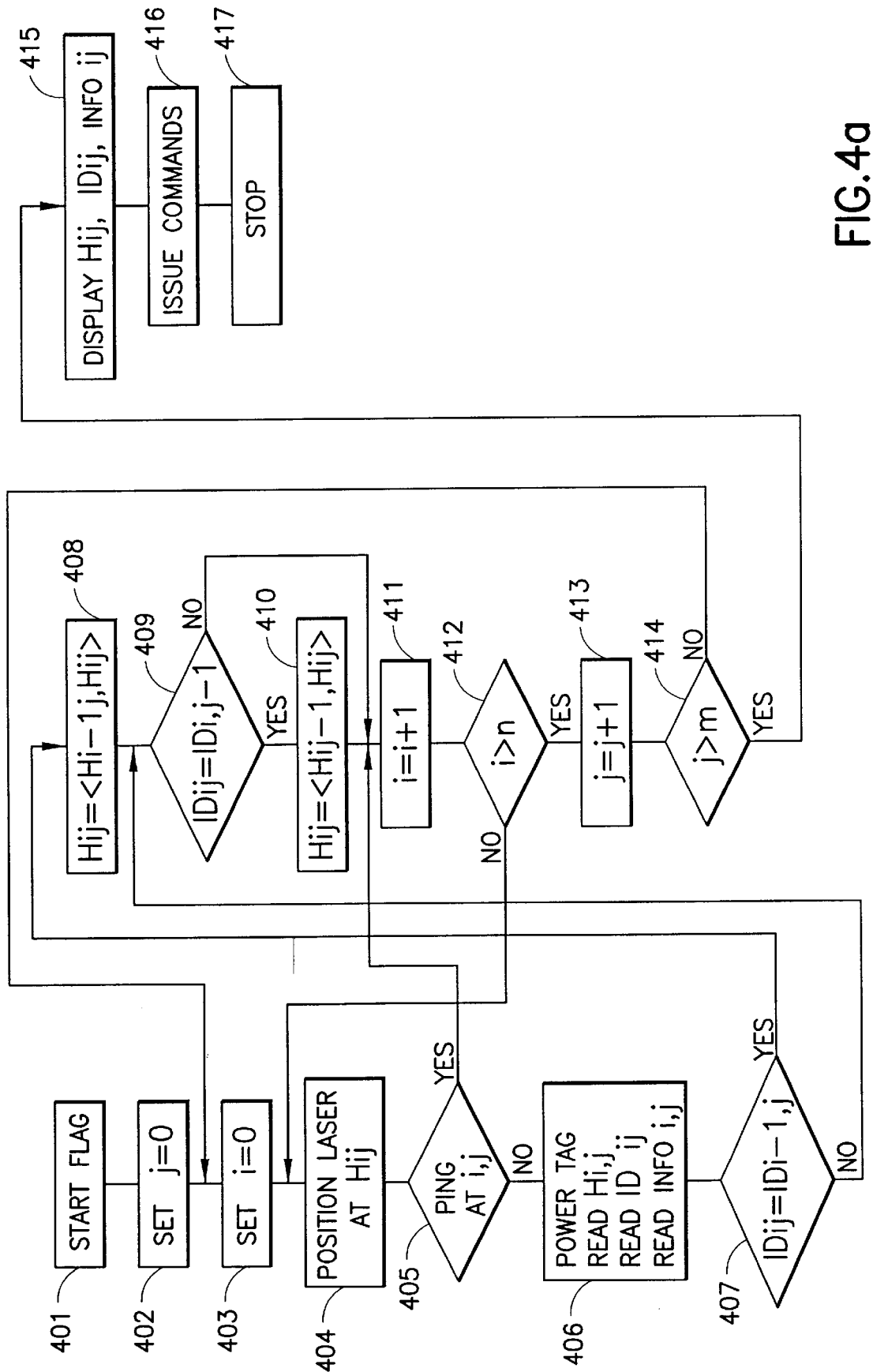
FIGS. 4a and 4b are alternative embodiments of those flow charts shown in FIG. 3 except that a scanning laser is used to turn on the tags sequentially to determine the position of the crate as a function of time for the pallet or cart being addressed.

FIG. 4a shows the flow diagram similar to that shown in FIG. 3a where the cart is stationary and a scanning laser is used to turn on the tags sequentially to determine the position of the crate as a function of time for the pallet or cart being addressed. The difference between FIGS. 4a and 3a is that in FIG. 4a the laser scans while the antenna remains stationary. In 404 the laser points at position $H_{ij}$. In step 405 the antenna receives a signal that causes the laser to remain stationary while the tag is powered and the variables H, ID and INFO are read 406. The subsequent steps 407–417 are similar to the steps 307–317 respectively.

Figure 4B:
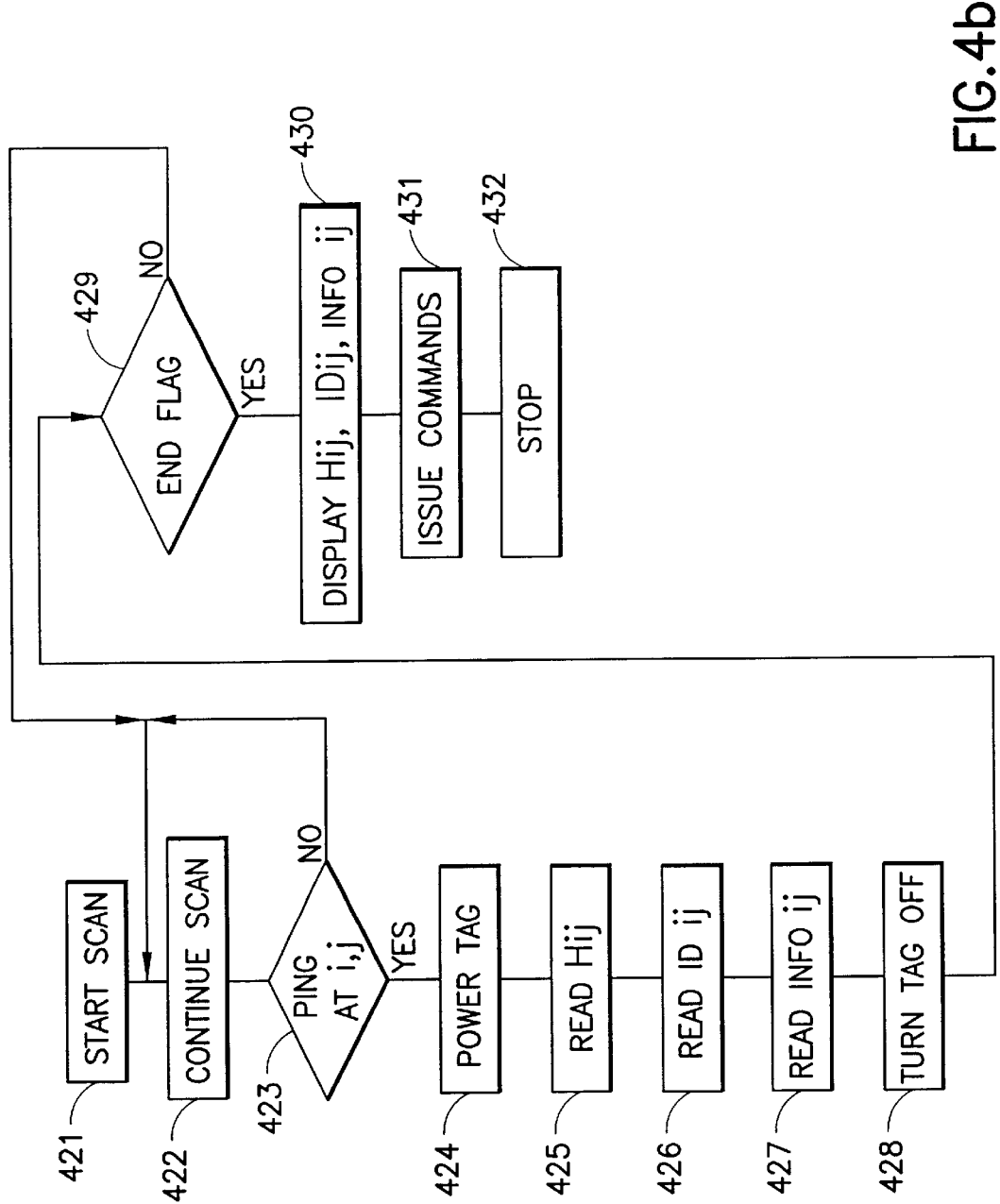

FIG. 4b contains similar steps as those found in 3b with the exception that step 423 is different from the corresponding step 323 in so far as pinging signifies the laser has identified the presence of a tag leads to 424 which powers the tag and then 425–428 are again similar 324–327 in which the variables are read for H, INFO ID are again read and the tag is turned off. The process continues with steps 429–432 which are similar to steps 328–321.

Figure 5A:
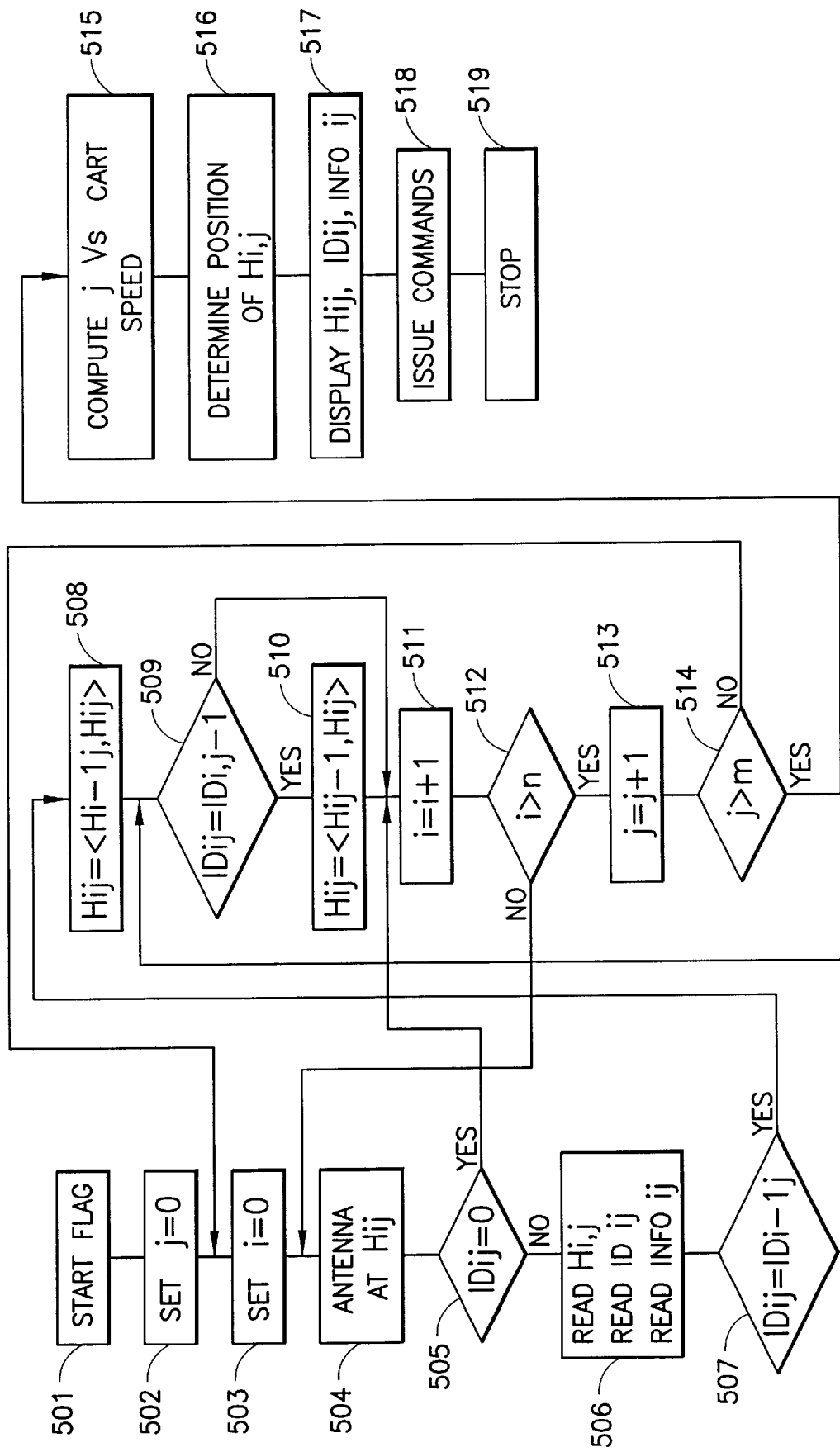
FIGS. 5a and 5b are alternative embodiments of those shown in FIGS. 3a and 3b, respectively, except here the cart is moving past the antenna, preferably though not necessarily at a constant velocity.
Figure 5B:
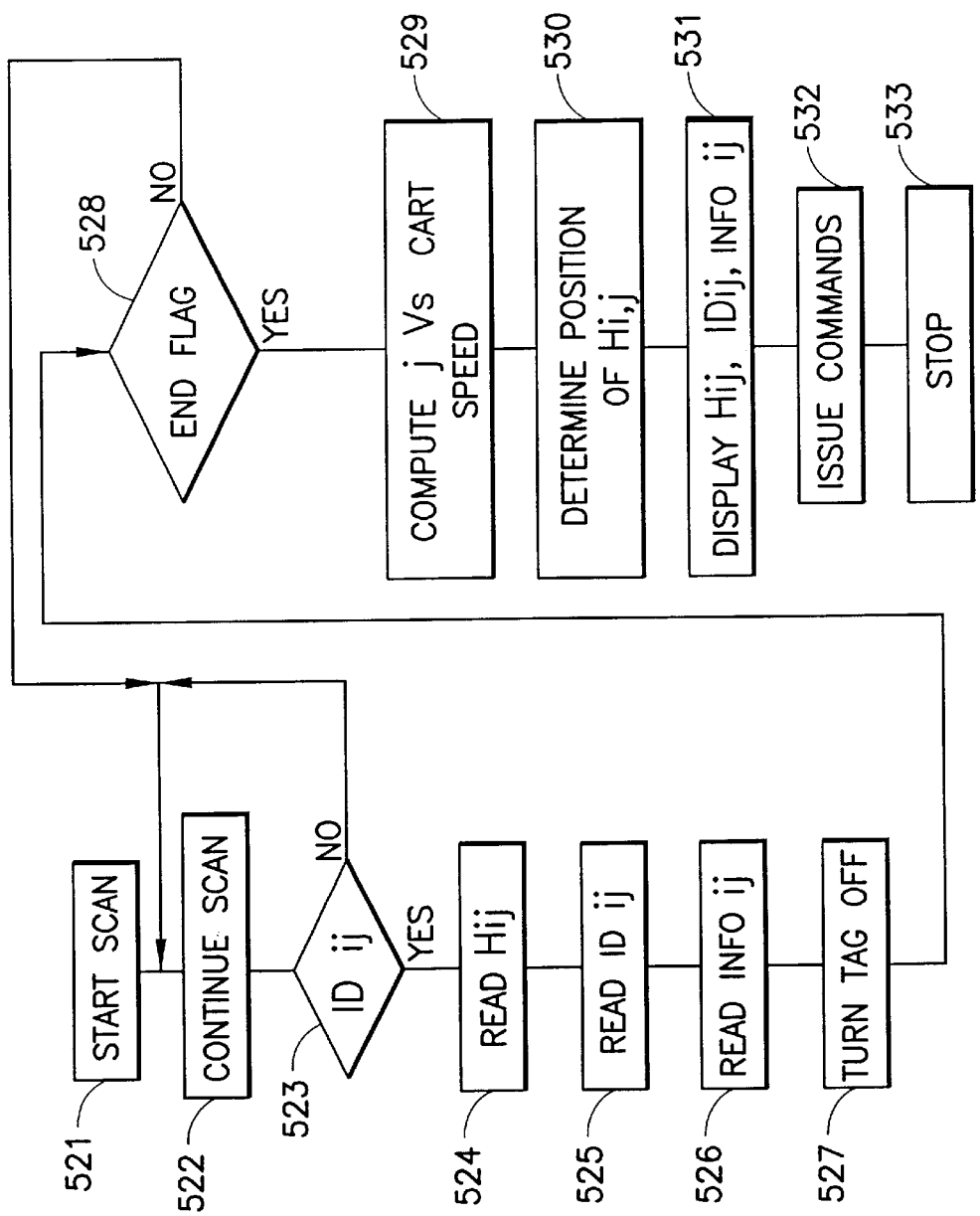

So far, the flow diagrams have dealt only with the antenna or the laser moving or scanning elements while the pallet or cart is stationary. In FIG. 5a, the steps are similar to those in FIGS. 3a except here the pallet or cart is moving, preferably at constant velocity past the scanning devices. For this case, the scanning of the antenna as described in FIG. 3 again scans the pallet but can also be made to scan in only the vertical plane. The steps in the flow diagram corresponding to FIG. 5a are similar to steps of the flow diagram of FIG. 3a, with the addition that in FIG. 5a, step 515 is added in which the position of the variable 'j' is computed with respect to the pallet or cart velocity. Step 516 determines the position of 'i,j' with respect to the pallet or cart reference. Step 517 displays the variables H, ID, INFO with respect to the pallet or cart reference frame. Commands are again issued 518 and the system terminates with step 519. FIG. 5b is similar to FIG. 3b except here the pallet or cart is moving, preferably at constant velocity past the scanning devices; the additional steps are labeled 529–533.

Figure 6A:
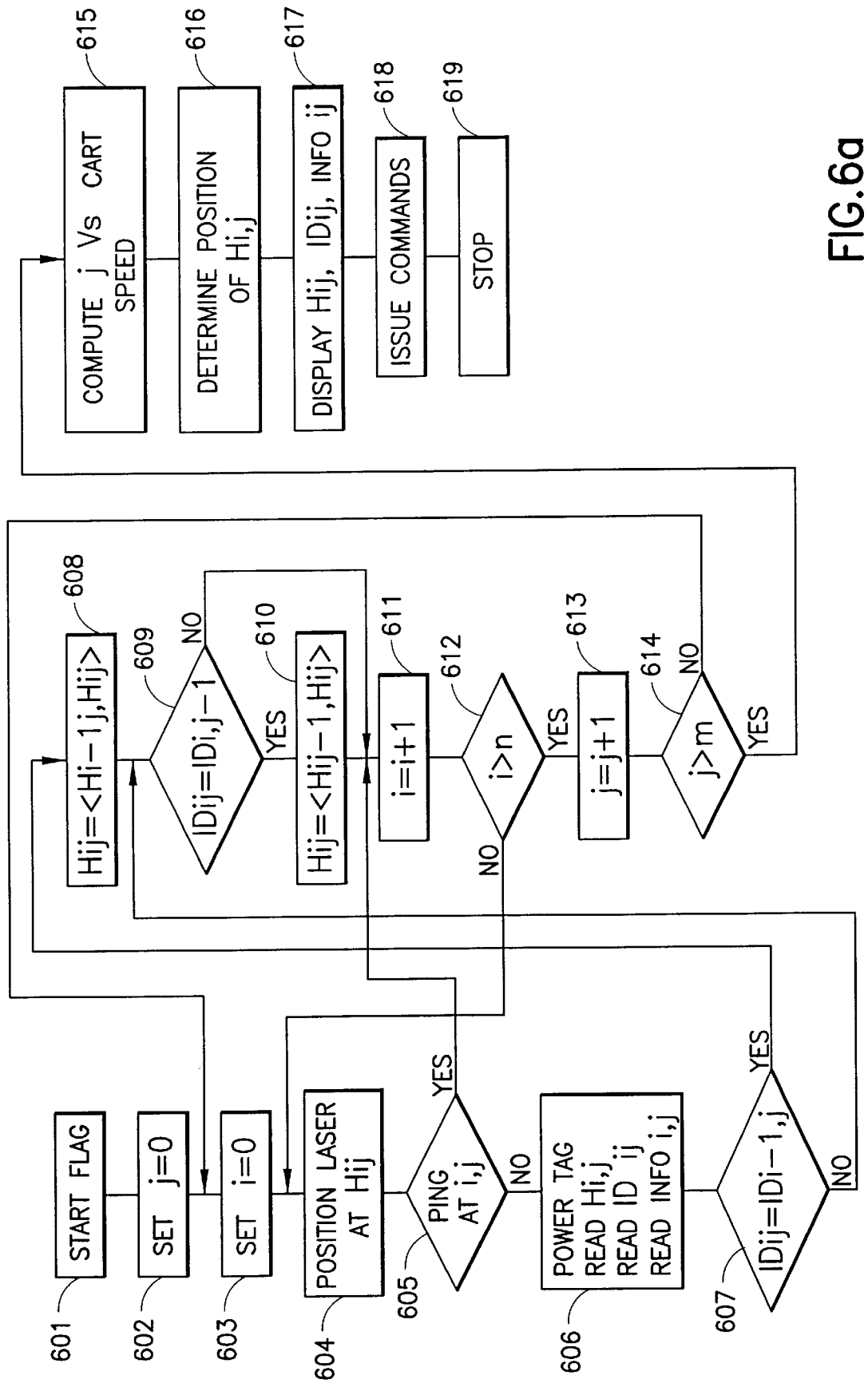
FIGS. 6a and 6b are alternative embodiments of those shown in FIGS. 4a and 4b, respectively, except here the cart is moving past the antenna, preferably though not necessarily at a constant velocity.
Figure 6B:
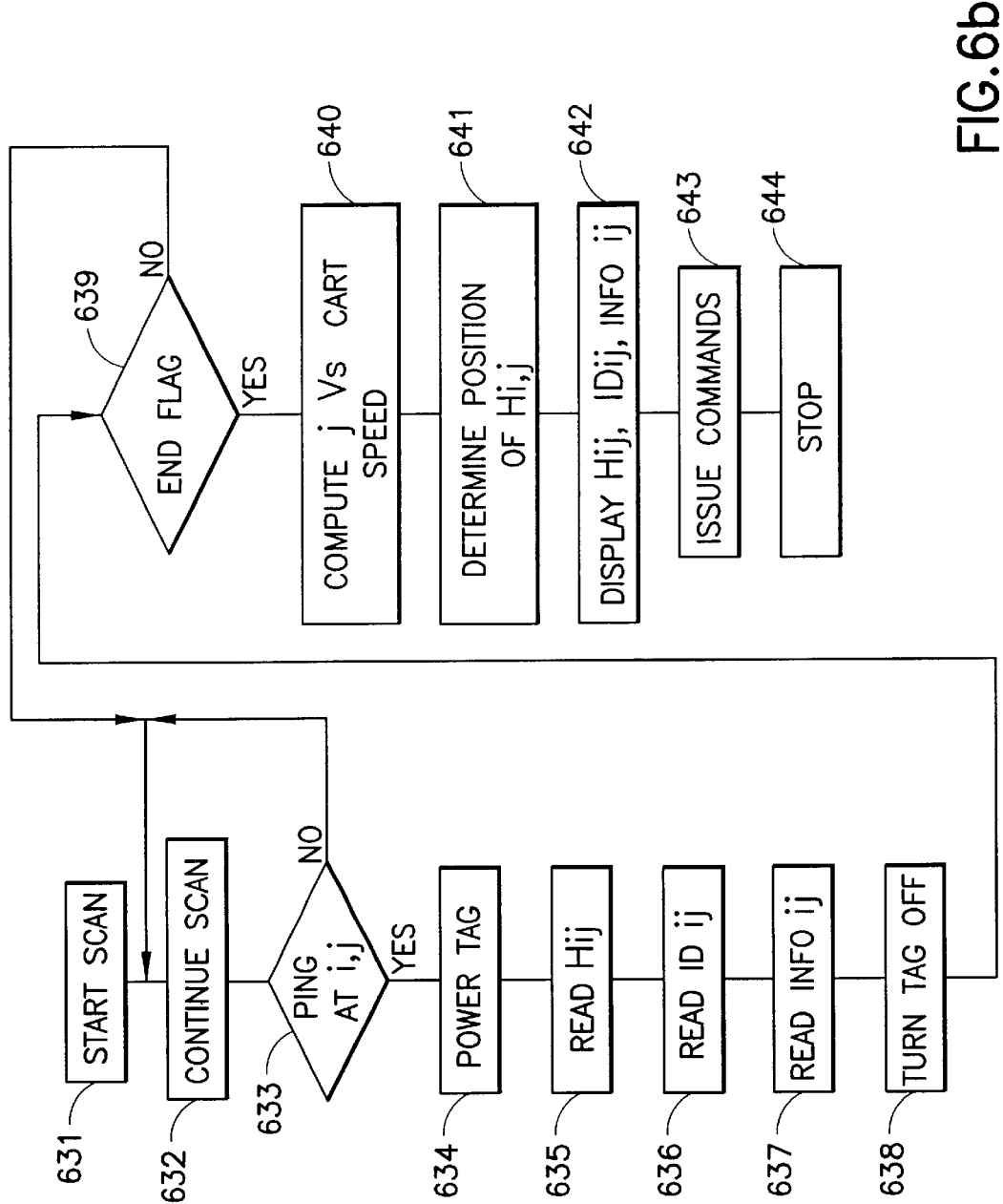

FIG. 6a corresponds to the steps of FIG. 4a except that the pallet or cart is now in motion. For this case, the scanning of the laser as described in FIG. 4 again scan the pallet but can also be made to scan in only the vertical plane The overall scanning and tag reading process follows in steps 616–619 which are identical to 515–519. The flow steps of FIG. 6b are similar to those of FIG. 4 with the addition of steps 640–644 which are the same as 616–619.

Figure 7:
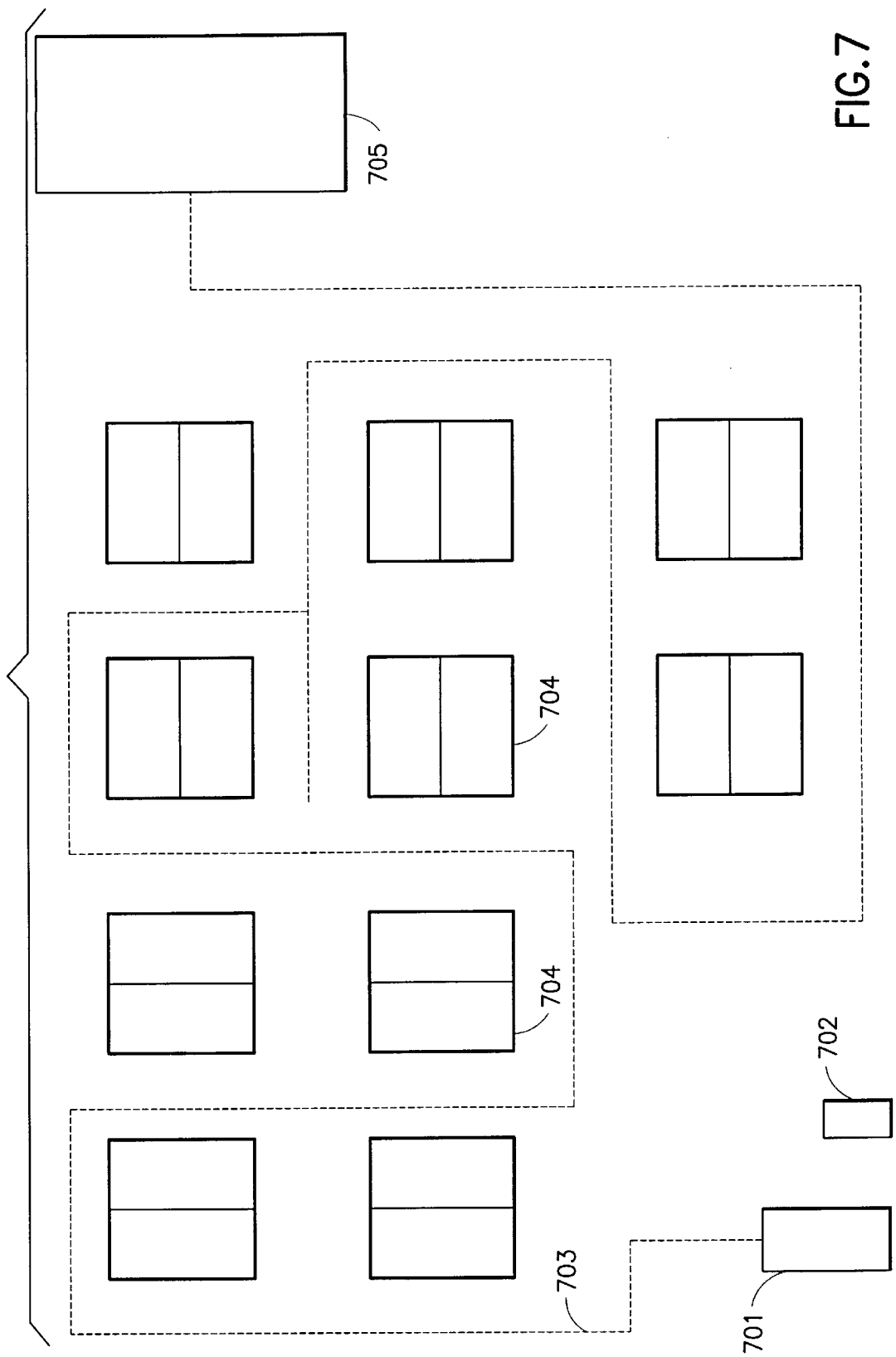
FIG. 7 is a block diagram describing the overall operation of a preferred system.

FIG. 7 shows the pallet or cart 701 stopping or passing in proximity to base station 702 where the tags are read and the position of the crates are determined with respect to a reference frame fixed to the pallet. Instruction for further cart movement and robot action are issued and the pallet starts a preprogrammed path 703 where unloading at selected storage or transport areas 704 or to a loading dock 705.

Figure 8:
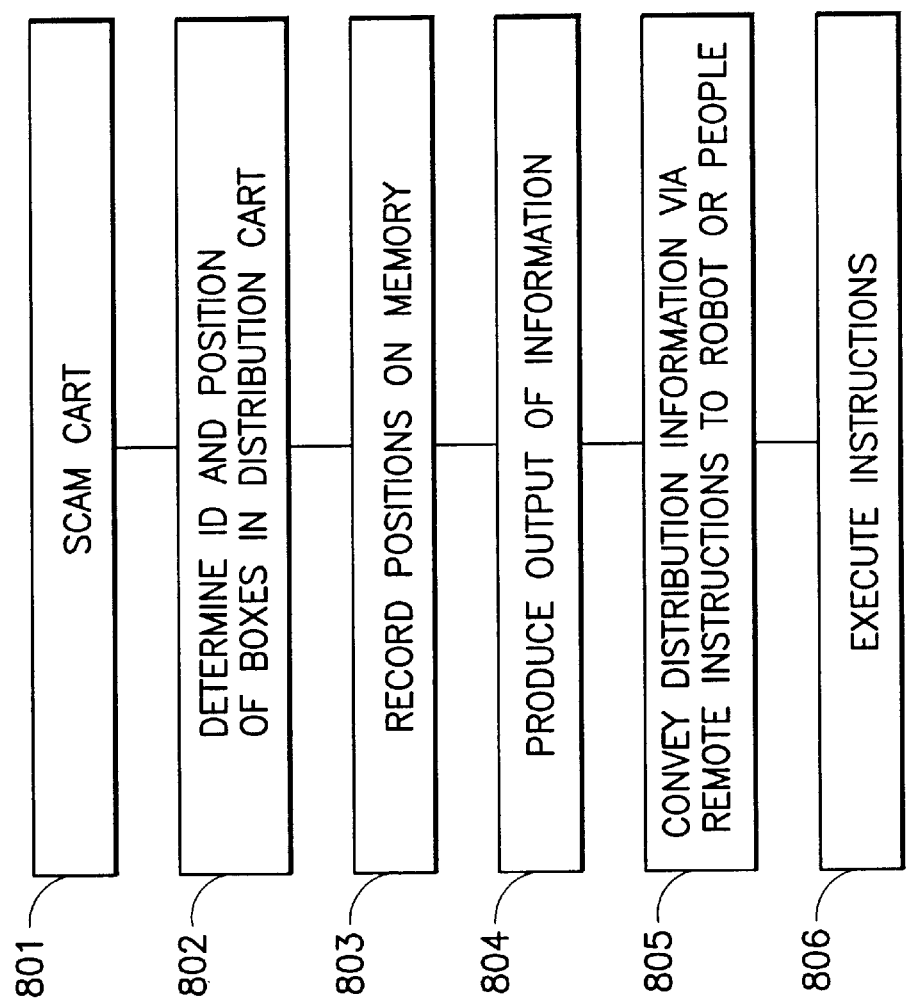
FIG. 8 is a flow diagram of the system's operation.

FIG. 8 shows the flow diagram of the system operation. In step 801 the pallet or cart is scanned. The ID of the boxes or crates are determined with respect to the pallet 802 and the positions are recorded in the computer memory 803. In step 804 an output of the information is produced. In step 805 the distribution information is conveyed to robots or people for 806 and the instructions are executed.

We claim:

1. A base station system for communicating with radio frequency tags attached to one or more objects, the objects each having a position, the base station further comprising:

one or more computers, each having one or more central processing units (CPUs) and one or more memories;

a position detector for determining the position of one or more of the tags within a time increment; and a communication process, executed by one or more of the CPUs, that reads information from one or more of the tags within the time increment and associates the position determined with the information of the respective tag in one or more of the memories, wherein the position is determined at least in part as a function of time within the time increment.

2. A system, as in claim 1, where the position detector has a first location device and a second location device and the position is determined as being between the first and second location devices.

3. A system, as in claim 2, where the first and second location devices are any one or more of the following: an electric sensor, an acoustic sensor, a photocell, and a pressure sensor.

4. A system, as in claim 1, where the position detector is comprised of a directional beam antenna.

5. A system, as in claim 4, where the directional beam antenna scans in the horizontal and vertical directions to determine the position.

6. A system, as in claim 4, where the directional beam antenna scans only in the vertical direction to determine the position.

7. A system, as in claim 6, where the object attached to the tag is moving in a horizontal direction with respect to the system.

8. A system, as in claim 1, where the position detector is comprised of a light source.

9. A system, as in claim 8, where the light source is any one or more of the following: a laser and a focused lamp.

10. A system, as in claim 8, where the light source is comprised of a laser that activates the tags from which the information is read.

11. A system, as in claim 10, where the laser activates the tag using any one or more of the following: a light sensitive switch and a photo cell.

12. A system, as in claim 1, where the object is comprised of any one or more of the following: a container, a storage area, a pallet, a box, and a shipping container.

13. A method for communicating with radio frequency tags attached to one or more objects, the objects each having a position, the method comprising the steps of:

using a position detector to determine the position of one or more of the tags within a time increment;

reading information from one or more of the tags within the time increment; and associating the position with the information of the respective tag, wherein the position is determined at least in part as a function of time within the time increment.

14. A system for communicating with radio frequency tags attached to one or more objects, the objects each having a position, the system comprising:

means for using a position detector to determine the position of one or more of the tags within a time increment;

means for reading information from one or more of the tags within the time increment; and means for associating the position with the information of the respective tag, wherein the position is determined at least in part as a function of time within the time increment.

15. A computer program, executed by a computer, that performs the steps of:

receiving the position of one or more of the tags within a time increment from a position detector;

reading information from one or more radio frequency tags within the time increment; and associating the position with the information of the respective tag, wherein the position is determined at least in part as a function of time within the time increment.

16. A method for communicating with individual ones of a plurality of radio frequency tags attached to individual ones of a plurality of objects, the method comprising:

sequentially interrogating individual ones of the radio frequency tags with a tag reader, where sequentially interrogating comprises causing relative motion between the radio frequency tags and the tag reader;

receiving information sequentially from individual ones of the radio frequency tags in response to being interrogated; and associating a position of individual ones of the objects in space with the received information.

17. A method as in claim 16, where the relative motion results from scanning a beam over the objects.

18. A method as in claim 16, where the relative motion results from scanning a beam over the objects along two axes.

19. A method as in claim 16, where the relative motion results from scanning a beam over the objects along one axis, and translating the plurality of objects along a second axis.

20. A method as in claim 16, where the relative motion results from scanning one of a radio frequency beam or a light beam over the objects.

* * * * *